United States Patent [19]

Schwarz et al.

[11] 4,321,013

[45] Mar. 23, 1982

[54] HEADPIECE SUPPORT FOR ROTOR OF A ROTARY WING AIRCRAFT

[75] Inventors: Alois Schwarz, Putzbrunn; Karlheinz Mautz, Ottobrunn, both of Fed. Rep. of Germany

[73] Assignee: Messerschmitt-Bolkow-Blohm Gesellschaft mit beschrankter Haftung, Munich, Fed. Rep. of Germany

[21] Appl. No.: 142,848

[22] Filed: Apr. 22, 1980

[30] Foreign Application Priority Data

Apr. 25, 1979 [DE] Fed. Rep. of Germany ....... 2916727

[51] Int. Cl.³ .............................................. B64C 11/06
[52] U.S. Cl. .......................... 416/244 R; 416/229 R; 416/241 A
[58] Field of Search .......... 416/134 A, 230 A, 241 A, 416/244 R

[56] References Cited

U.S. PATENT DOCUMENTS

| | | | |
|---|---|---|---|
| 3,279,278 | 10/1966 | Eldred | 416/134 A |
| 3,384,185 | 5/1968 | Fernandez | 416/244 |
| 4,156,583 | 5/1979 | Mayerjak | 416/134 A |
| 4,257,738 | 3/1981 | Schwarz et al. | 416/134 A |

*Primary Examiner*—Leonard E. Smith
*Attorney, Agent, or Firm*—Toren, McGeady & Stanger

[57] ABSTRACT

In a rotor for a rotary wing aircraft, an integral central headpiece supports the rotor blades. The headpiece consists of two plates interconnected by a centrally arranged distance member. Each plate has a similar star-shape with at least four angularly spaced point-like arms. Each plate is formed of a number of superposed layers with each layer containing continuous loops extending in the direction of the point-like arms. At least one loop extends from one point-like arm into another diametrically opposite point-like arm. Others of the loops, located in the other point-like arms, extend radially outwardly from the loop extending through the two point-like arms. The headpiece consisting of the plates and distance member, is a unitary or integral structure.

15 Claims, 6 Drawing Figures

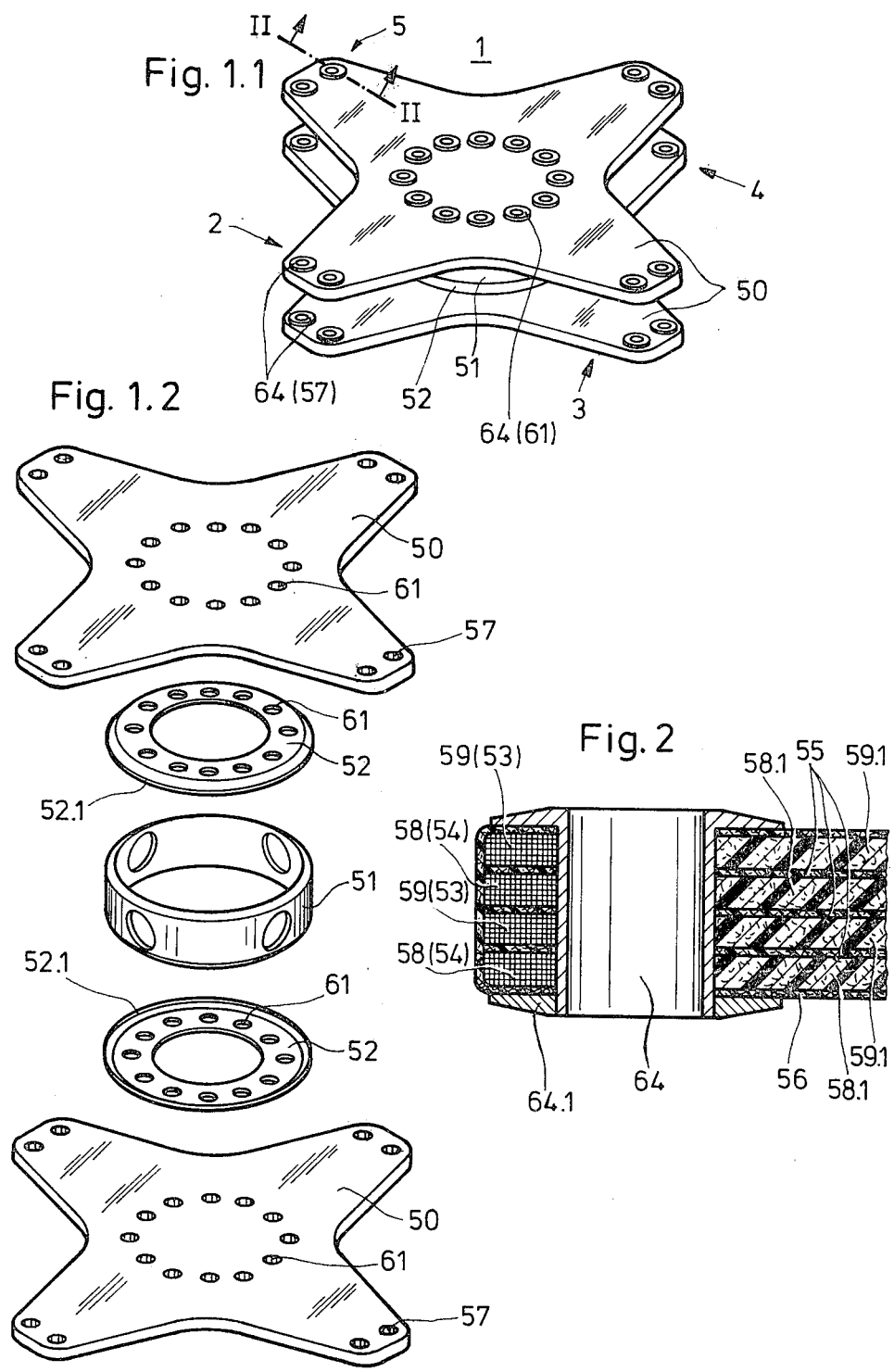

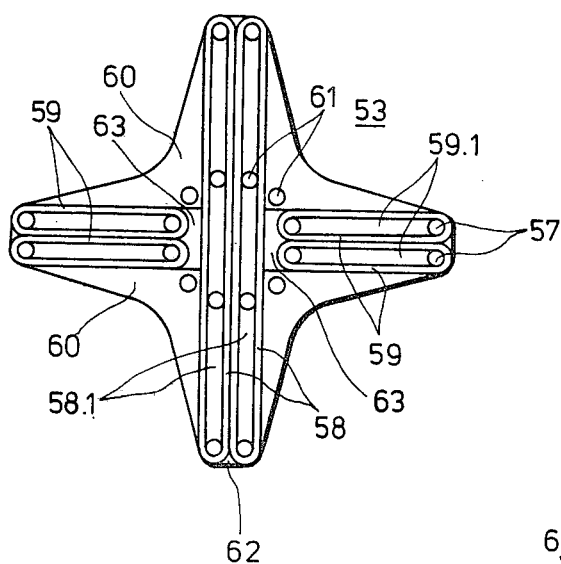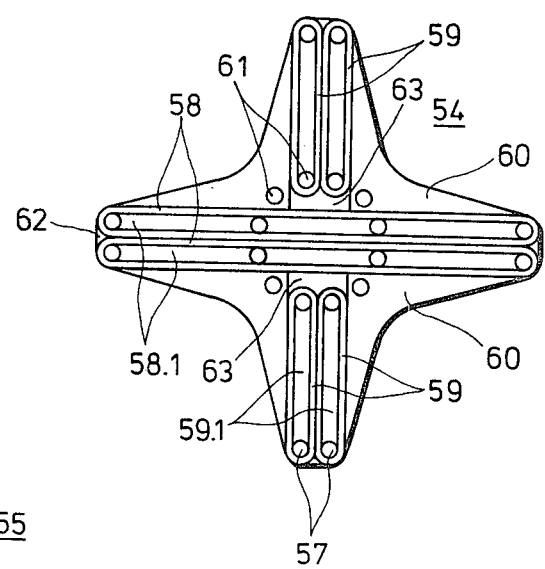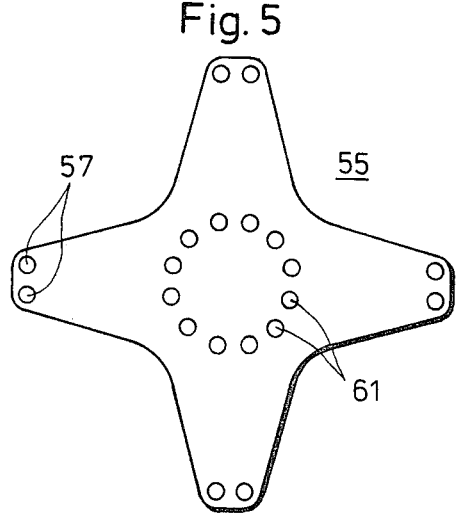

4,321,013

HEADPIECE SUPPORT FOR ROTOR OF A ROTARY WING AIRCRAFT

SUMMARY OF THE INVENTION

The present invention is directed to a rotor for a rotary wing aircraft, and more particularly, to a central headpiece of the rotor which supports the rotor blades.

The present invention is an improvement of the rotor mounting assembly disclosed in U.S. Patent Application Ser. No. 886,653 filed Mar. 15, 1978, now U.S. Pat. No. 4,257,738. In this co-pending application, the rotor mounting assembly which, compared to known embodiments having a central headpiece formed entirely or mostly of high-strength metallic material, is formed of an arrangement having a significantly reduced weight which has the advantage that it does not negatively affect the reliability in operation and the load carrying ability of the rotor. Another significant advantage involves the especially simple and inexpensive production of the headpiece indicated by the fact that the headpiece is formed of an integral unit including two coincidentally shaped plates disposed in spaced relation and interconnected by an intermediate piece. The intermediate piece can be divided and/or hollow. When these plates are assembled in the conventional manner in a laminating procedure from a plurality of synthetic resin impregnated glass fiber fabric layers or mats cut in a star-shape, the blade supports or so-called rotor arms which are bifurcated because of the star-shape of the plates must, for reasons of strength, be constructed along their free sides in the manner of forks or prongs with a relatively great spacing between the parts forming the forks or prongs. This relatively great width is provided in the blade support portions to provide connecting bores required for the fastening bolts for the support or bearing means for the rotor blades without reducing the protection against fracture. Taking into consideration the requirement of the maximum freedom of mobility of the rotor blades for the angular movement of blade adjustment, this design of the blade supports with widely spaced fork parts, requires a wide spacing of the plates, that is the width of the fork of the blade support, resulting, on one hand, in a length causing an increased bending stress in the fastening bolts, and on the other hand, in a structural height of the headpiece which is undesirably large for aerodynamic reasons. Moreover, for reasons of strength, the fabric structure of the headpiece sets limits on its use, for instance, the use is limited to rotors with low rates of rotation.

Therefore, it is the primary object of the present invention to provide a rotor of the above-mentioned type with a central headpiece free of these structural disadvantages and also to provide a headpiece capable of absorbing and withstanding high stresses. As a result, such a headpiece is suitable for rotors with high rates of rotation during which the centrifugal forces on the blades are relatively great in respect to the blade flapping and blade lag moments.

In accordance with the present invention, the central headpiece is an integral unit formed of a pair of similarly shaped plates spaced apart and interconnected by a distance member. The plates are formed of a plurality of superposed layers with each layer containing angularly disposed continuous loops. The loops provide a unidirectional fiber orientation within the layers extending in the direction of the point-like arms of the plates which afford the rotor blade supports. The basic concept of the invention involves not only the use of unidirectional fiber orientation of the fiber loops and fiber members, which are particularly suitable for absorbing and transmitting centrifugal forces of the blades, but also in the ability to absorb high tensile stresses. The components of the plates can be produced in any desired design without difficulty for providing the high tensile strength and absorbing characteristic. Accordingly, the headpiece can be provided in a desired compact design having the same cross section as a pure fabric structure while having approximately three times the strength under tensile load. Finally, the combination of the layers containing the loops with intermediate layers capable of absorbing tensile and compressive loads, results in a laminated or stratified body which can be constructed in a functional repetitive manner in the event a fiber loop is damaged. Moreover, it is possible without any difficulty to achieve a most compact arrangement in all loading directions of the headpiece depending on its requirements. Such a feature is especially desirable, since the headpice is intended for mass production and its structural arrangements permits it to be reproducible in a convenient manner.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

BRIEF DESCRIPTION OF THE DRAWING

In the drawing:

FIG. 1.1 is a perspective view of a unitary central headpiece for a four-blade rotor;

FIG. 1.2 is an exploded perspective view illustrating the components of the unitary central headpiece shown in FIG. 1.1;

FIG. 2 is a sectional view on an enlarged scale, taken along the line II—II in FIG. 1.1; and FIGS. 3, 4 and 5 each show one of the layers of the plates of the central headpiece which are part of the laminated structure shown in FIG. 2.

DETAIL DESCRIPTION OF THE INVENTION

In FIG. 1.1 a central headpiece 1 is shown used in a rotor for a rotary wing aircraft. Central headpiece 1 is used for a rotor having four rotor blades, not shown, and the headpiece has four bifurcated blade supports or rotor arms, 2, 3, 4, 5. The blade supports 2, 4 are located diametrically opposite one another as are the blade supports 3 and 5. As in the above mentioned United States Patent Application Ser. No. 886,653, the headpiece 1 is an integral unit or body of composite fiber material, such as glass fibers in a synthetic resin matrix. The suspension of the rotor blades in the blade supports 2, 3, 4, 5 can be effected by a rotor blade support or bearing as disclosed in German Application No. P 28 27 320.3, accordingly, such supports are not described herein. Though the headpiece 1 is an integral body, in FIG. 1.2 it is shown separated into the parts which make up the integral body. The headpiece 1 includes two star-shaped plates 50 each being the same size and shape with each star-shaped plate having point-like arms forming the opposite sides of the bifurcated blade supports 2, 3, 4, 5. As can be seen in FIG. 1.1 the point-like arms are oppositely disposed and in aligned relationship. A circular cylindrical distance member or spacer 51 extends between the plates interconnecting them in a spaced generally parallel manner. Additionally, annular centering plates 52 are located at the opposite ends of the distance member 51 each formed integrally with a corresponding one of the plates 50. In FIG. 1.2 the headpiece is shown separated for better illustration, however, during production these parts are joined together, for example, while in the not fully hardened or only prehardened state they are jointly hardened under pressure providing the intimate, integral unitary structure. As compared to the headpiece disclosed in U.S. Patent Application Ser. No. 886,653, in headpiece 1 the distance member 51 can be produced in a roving winding method because of its circular cylindrical shape and, therefore, it is significantly lighter than a solid member while having at least the same strength. Each of the annular plates 52 has a beaded edge 52.1 for centering the distance member 51 and preferably these plates are compression molded parts of a fiber-reinforced laminate. Accordingly, as is also true for the distance member 51, the annular plates 52 can be mass-produced in a simple and inexpensive manner.

Apart from these distinguishing features, the essential difference of the central headpiece 1 compared to the application of which it is an improvement, involves the multiple-layer construction of the plates 50 as illustrated in FIG. 2. In the rotor having four rotor arms, that is, two oppositely disposed pairs of rotor blades, each plate consists of the layers 53 and 54 illustrated in FIGS. 3 and 4 with an intermediate layer 55, as shown in FIG. 5, between each of the layers 53, 54. Depending on strength requirements, however, as illustrated in FIG. 2, a multiple superposed arrangement of the layers 53, 54 can be provided with intermediate layers 55 and an enclosing cover layer 56. Layers 53, 54, as shown in FIGS. 3 and 4, differ from one another only in their relative positions. As shown in FIG. 2, a layer 53, as illustrated in FIG. 3, is followed by a layer 54, as illustrated in FIG. 4, or the reverse arrangement is possible, with an intermediate layer, as illustrated in FIG. 5, disposed between them. The positions of these layers superposed on one another and turned relative to one another are shown in FIGS. 3 and 4. In the outer ends of the point-like arms of the blade supports 2, 3, 4, 5, a pair of bores 57 extend through the layers for effecting the rotor blade support. A pair of endless fiber loops 58 extend continuously through a pair of oppositely disposed point-like arms portions of the layers. The loops are arranged in side-by-side relation so that at each end each loop extends around one of the bores 57. Each of the loops 58 traverses the center of the headpiece. In addition, each of the other two point-like arm portions of the layer have two fiber loops 59 extending in the direction of the blade supports, that is in the direction of the rotor blades. Each of the loops 59 is continuous and extends around one of the bores 57 in the radially outer ends of the point-like arm portions of the layer and around a connecting bore 61 for the rotor, with the bores 61 arranged in a circle around the central part of the layer, that is, in the portion of the layer which forms the junction of the point-like arm portions. Accordingly, a pair of continuous endless fiber loops 58 extend across the layer from one point-like arm portion into the other while in the other two point-like arm portions a pair of endless fiber loops 59 are provided so that these loops extend generally perpendicularly and radially outwardly from the connecting bores 61 adjacent the loops 58 to the outer ends of the point-like arms portions in which they are located. In other words, the pairs of fiber loops 59 in oppositely disposed point-like arm portions of the layers are separated by the pair of loops 58. Accordingly, in view of the orientation of the loops 58, 59 as shown in FIGS. 3 and 4, in adjacent layers the loops 58 are aligned with the two pairs of loops 59, that is, in adjacent layers the fiber loops 58 in one extend in the same direction as the two pairs of fiber loops 59 in the other. As illustrated in FIG. 2, layers 53, 54 are integrally connected together by an intermediate layer 55 as is shown in FIG. 5. Cover layer 56 covers the upper and lower ones of the layers of the laminated plate. The intermediate layers 55 and the cover layer 56 consists of a fabric laminate for stiffening the entire composite construction of the headpiece 1. Additional support members 58.1, 59.1 are provided within the fiber loops 58, 59 while filler pieces 60 extend between the loops in angularly adjacent point-like portions of the layers. These support members 58.1, 59.1 and filler pieces 60 are integrally combined with the layer and the intermediate layer. The filler pieces extend along the longitudinal edges of the loops 58, 59 in angularly adjacent point-like arms portions of the layer. Since a material union or interconnection exists for each layer 53, 54 between the support members 58.1, 59.1 and the corresponding fiber loops 58, 59 and between the filler pieces 60 and the adjacent fiber loops 58, 59, the support members 58.1, 59.1 and the filler pieces 60 contribute significantly to the bending stiffness of the laminated plate 50. Furthermore, these parts provide a significant support for the fiber loops 58, 59 in the blade flapping and blade lag directions so that they can be designed exclusively for their assigned functions as elements which absorb and transmit the centrifugal forces of the blades. Moreover, the described composite construction of the plates 50 has the additional advantage that, as is true for the connecting bores 57 in the blade supports 2, 3, 4, 5, the additional connecting bores 61 form a connection for a rotor shaft, not shown, located within the fiber loops 58, 59 and extend exclusively through fabric laminate material, so that none of the fiber strands of the fiber loops 58, 59 are severed. It must be emphasized, however, in this connection that with regard to the fiber loops 59, as compared to the fiber loops 58, in the described composite construction, the pair of loops 59 is less effective by about 10% in its designated function of absorbing and transmitting centrifugal forces, if at all, in the center of the plate or layer. Consequently, loops 59 can have a open construction at the location of the connecting bores 61.

Last but not least, it is important that all of the above described parts, as shown in a separate manner in FIG. 1.2, include additional filler pieces 62, 63 for lining and levelling or smoothing over any remaining indentations or hollow spaces and that these filler pieces are suitable for mass production. In other words, such filler pieces can be reproduced by machine without any problems so that the headpiece 1 can be produced according to a modular system or the mechanical assembly technique, whereby the headpieces can be produced in an especially economical manner. If necessary, such headpieces can be provided for rotors with more than two pairs of rotor blades. In the illustrated embodiment, the rotor has two pair of diametrically disposed rotor blades with two connecting bores extending through the plates 50 for each blade support 2, 3, 4, 5, accordingly, where additional rotor blades are provided in each layer additional fiber loops 59 will be provided with these loops extending in additional point-like arm portions of the layers for the rotor blade supports. In addition, all of the connecting bores 57, 61 can be lined with a compressive load-bearing bushing, such as shown in FIG. 2, with a collar bushing 64 made of metal with shrunk on safety or locking disks 64.1 so that the conventional use of so-called necked-down bolts, used as connecting means between the headpiece and the rotor shaft or the rotor blade supports, does not lead to deformation of the composite fiber structure of the headpiece 1.

While specific embodiments of the invention have been shown and described in detail to illustrate the application of the inventive principles, it will be understood that the invention may be embodied otherwise without departing from such principles.

What is claimed is:

1. In a rotor for a rotary wing aircraft having a central headpiece having radially outwardly extending blade supports for supporting rotor blades, said central headpiece comprising an integral body of composite fiber material, said body comprising a pair of similarly shaped oppositely arranged star-shaped plates spaced from one another, and at least one distance member extending between and interconnecting said plates, said central headpiece arranged to support an even number of at least four rotor blades with said blades arranged in diametrically opposed pairs, said plate having a point-like arm corresponding to each of the blades supported thereon, wherein the improvement comprises that each plate includes a plurality of layers, each said layer comprising at least one first fiber loop extending from one said point-like arm into another diametrically opposed said point-like arm, and at least a second and a third fiber loop extending obliquely of said first fiber loop and each located in a different one of said point-like arms extending transversely of said point-like arms containing said first fiber loop, each said second and third loops extending through said point-like arm in which the second or third loop is located and extending from adjacent said first loop generally radially outwardly through said point-like arm relative to the center of said layer so that said second and third loops are separated by said first loop, in each adjacent pair of said layers said first loop in the one of said layers extends in the same direction of at least the one said second and third loops in the other said layer, and an intermediate layer inegrally connecting adjacent said layers containing said loops.

2. In a rotor, as set forth in claim 1, wherein the fibers in said first loop extends endlessly and continuously therethrough.

3. In a rotor, as set forth in claim 1, wherein the fibers in each of said first, second and third loops extends endlessly and continuously therethrough.

4. In a rotor, as set forth in claim 1, wherein each of said point-like arms at the radially outer ends thereof having connecting bores therethrough, said connecting bores extending through each of said layers of said plate, said connecting bores arranged for fastening the support of the rotor blade, and the number of said connecting bores located in the point-like arms of said layers determines the number of said fiber loops with said fiber loops in each said point-like arm extending in side-by-side relation in the direction of said point-like arm.

5. In a rotor, as set forth in claim 1 or 4, wherein loop support members having a cross-wire fiber orientation therein are located with and each support one of said first, second and third fiber loops.

6. In a rotor, as set forth in claim 5, wherein said support members for said first, second and third loops are integrally interconnected with said intermediate layer.

7. In a rotor, as set forth in claims 1 or 4, wherein filler pieces integrally interconnect said first, second and third fiber loops in angularly adjacent said point-like arms in said layers, and said filler pieces having a cross-wise fiber orientation therein.

8. In a rotor, as set forth in claim 7, wherein said filler pieces are integrally interconnected with said intermediate layer with said intermediate layer being in superposed relation with said filler pieces in the angular spacing between said first, second and third fiber loops in superposed layers of said plates.

9. In a rotor, as set forth in claim 1, wherein the number of said layers in each said plate corresponds to the number of said point-like arms in said plate.

10. In a rotor, as set forth in claim 9, wherein the fibers in said intermediate layer having a cross-wise orientation.

11. In a rotor, as set forth in claim 9, wherein said distance member is a circular cylindrical body including annular plates located at the opposite ends of said cylindrical body and projecting outwardly therefrom with the circumferential edge of said annular plates each having a beaded edge for centering said cylindrical body relative to the center of said plates.

12. In a rotor, as set forth in claim 11, wherein said distance member is a wound hollow body.

13. In a rotor, as set forth in claim 11, wherein said annular plates have a cross-wise fiber orientation therein.

14. In a rotor, as set forth in claim 11, wherein said plates and said annular plates have connecting bores therethrough for connecting said headpiece to a rotor shaft, said connecting bores through the outer ends of said point-like arms of said plates and said connecting bores through said plates and said annular plates extending only through the portions of said plates and annular plates having a cross-wise fiber orientation.

15. In a rotor, as set forth in claim 14, wherein a pressure-bearing bushing located within each of said connecting bores extending through the outer ends of said point-like arms and through said plates and said annular plates and said bushings including means for locking said bushing to said plates.

* * * * *